United States Patent [19]

Bassi et al.

[11] Patent Number: 5,164,168
[45] Date of Patent: * Nov. 17, 1992

[54] METHOD AND APPARATUS FOR PURIFYING AIR

[75] Inventors: Pawan K. Bassi, Benicia, Calif.; Kenneth C. Eastwell, Penticton; James S. Goudey, Calgary; Mary E. Spencer, Alberta, all of Canada

[73] Assignee: The Governors of the University of Alberta, Edmonton, Canada

[ * ] Notice: The portion of the term of this patent subsequent to Apr. 16, 2008 has been disclaimed.

[21] Appl. No.: 683,795

[22] Filed: Apr. 11, 1991

Related U.S. Application Data

[63] Continuation-in-part of Ser. No. 277,254, Nov. 29, 1988. Pat. No. 5,008,091.

[51] Int. Cl.$^5$ .................. B01J 8/00; C07C 11/24; B01D 47/00
[52] U.S. Cl. .................. 423/245.1; 423/210
[58] Field of Search .................. 423/245.3, 245.1, 210

[56] References Cited

U.S. PATENT DOCUMENTS 5,008,091 4/1991 Bassi et al. .................. 423/245

Primary Examiner—Gregory A. Heller
Attorney, Agent, or Firm—Shoemaker and Mattare

[57] ABSTRACT

Low molecular weight hydrocarbons are removed from air by preheating the air and then passing the preheated air through a heated catalytic bed comprising a mixture of catalytic pellets and metal turnings. The turnings provide for uniform heating of the bed and enable the desired temperatures of the catalytic bed to be maintained with minimum expenditure of energy.

9 Claims, 3 Drawing Sheets

METHOD AND APPARATUS FOR PURIFYING AIR

This is a continuation-in-part of U.S. patent application Ser. No. 277,254 filed Nov. 29, 1988 now U.S. Pat. No. 5,008,091.

FIELD OF THE INVENTION

The present invention relates to a method and apparatus for removing low molecular weight organic compounds present as impurities in air supplies and waste gases.

BACKGROUND OF THIS INVENTION

Contaminated air supplies are of concern in many economic sectors, such as commercial horticulture, as well as to scientists studying growth and metabolism of plants, animals, or microorganisms. Ethylene is produced by and has effects on all of them. Ethylene is widely recognized as a plant growth regulator and levels less than 50 ppb in air can alter plant metabolism. For instance, the role of ethylene in the ripening of climacteric fruits is well documented. The post-harvest storage life of climacteric fruits can be extended by removing ethylene, evolved by the produce and from other sources, from the storage atmosphere. Our invention provides a reliable, efficient, and safe method for obtaining hydrocarbon free air for other purposes as well.

Exhaust gases may also include at very low concentrations, harmful low molecular weight organic compounds such as hydrocarbons and/or hydrocarbons containing heteroatoms. Ethylene oxide is an example of a contaminant in the medical field. It is commonly used as a sterilizing agent in a sterilizing gas which includes as carriers various types of halocarbons (Freon®) or other environmentally friendly carriers. Ethylene oxide is also an important industrial chemical and can be a pollutant. Its major use is as an intermediate in the production of various chemicals. It may also be used in food sterilization.

A variety of oxidative and adsorptive approaches to removing organic compounds present as impurities in air supplies have been proposed. Adsorbent traps are often less effective, as they have finite binding capacities and they frequently require the handling and/or disposal of toxic materials. For most applications, oxidative methods are preferred, including reaction with ozone, atomic oxygen, potassium permanganate or metal catalysts. Ozone is a powerful oxidant but it is highly corrosive and toxic to man at low concentrations. Atomic oxygen is more reactive than ozone towards ethylene but this approach, like reaction with ozone, requires specialized equipment and trained personnel. Although permanganate is non-volatile, a large surface area is required to remove trace amounts of ethylene from air supplies. Permanganate is normally not reusable and requires special and expensive procedures for handling and disposal. In addition, this method is non-selective, dangerous and, in many cases, does not effect complete removal of hydrocarbon gases.

Air flow through a heated metal catalyst (nickel, copper, zinc, cobalt, platinum and palladium) is an effective method of removing low molecular weight hydrocarbons. Hydrocarbons are oxidized to carbon dioxide and water in the presence of the catalyst. Metal catalysts are reusable and stable during extended use if provided with sufficient oxygen for regeneration and heated within specified operating temperatures. (High temperatures can damage certain metal catalysts and reduce their efficiency.) The amount of oxygen required for regeneration is stoichiometrically related to the levels of hydrocarbons removed (oxidized) from the air stream. For the trace amounts of hydrocarbons present in most air supplies (<10 ppm) the amount of oxygen consumed is negligible. Levels of carbon dioxide produced under these conditions are also minimal.

The efficiency of any catalyst is largely determined by the amount of active surface area and control over catalyst temperature. The active surface area can be increased by coating a suitable fibrous support material, such as asbestos, with the metal catalyst. On more rigid porous support materials (such as aluminum oxide pellets) a greater active surface area can be achieved by impregnating with metal solutions containing organic solutes (fatty acids for example) that lower the surface tension and/or by infiltrating under partial vacuum. The organic solutes are then removed (oxidized) at high temperature before the catalyst is used. Both methods increase the penetration of the soluble metal into the support material thereby developing a greater active surface area.

Non rigid catalyst support materials such as asbestos are disadvantageous for systems with high flow rates. Furthermore, asbestos is a health hazard. High flow rates may compress these materials, which will impede air flow and reduce catalyst efficiency. Moreover, increasing the active surface area on more rigid support materials does not, in most cases, enhance catalyst efficiency sufficiently to provide 100% efficiency at high flow rates.

The combustion of a low molecular weight hydrocarbon (ethylene) by catalytic combustion in the presence of platinum is already well known, and reference may be made to U.S. Pat. No. 4,331,693, issued May 25, 1982 to Wojciechowski. In this patent, aluminum oxide is impregnated with a solution of a fatty acid followed by chloroplatinic acid, then dried and heated.

Other patents of interest which are related to various techniques of catalytic oxidation of carbon containing materials include U.S. Pat. Nos. 1,869,736; 3,025,132; 3,167,400; 3,654,432; 4,138,220; 4,867,949; and U.K. patents 953,216 and 2,065,629.

GENERAL DESCRIPTION OF THIS INVENTION

In view of the problems inherent in conventional approaches to this problem, an aspect of this invention provides a method and apparatus specially designed to effect the substantially complete oxidation of low molecular weight organic compounds at high flow rates. Such low molecular weight organic compounds usually contain one to six carbon atoms. A major factor in achieving this aim is the efficient and uniform heating of the catalyst bed, accomplished by incorporating a good thermal conductor into the catalyst bed. More particularly, turnings made of stainless steel or other suitable metal or mixture of different metals are incorporated into the bed for this purpose. Metallic oxides in pellet form, acting as a substrate for the catalyst, also provide better heat conductivity than catalyst supports such as asbestos. Additionally, the contaminated influent air stream or waste gas air stream is preferably preheated before it comes in contact with the catalyst, thereby preventing uneven heating of the catalyst bed.

According to an aspect of the present invention, a method for catalytically oxidizing low molecular weight organic compounds in an air stream containing such organic compounds to remove such organic compounds from such air stream by oxidative degradation of such organic compounds into carbon dioxide and water, said method comprises:

i) preheating said air stream to a elevated temperature which promotes catalytic oxidation of said organic compounds into carbon dioxide and water;

ii) introducing said preheated air stream to a porous static packed bed of catalytic material;

iii) heating said packed catalytic bed and maintaining said packed catalytic bed at an elevated temperature to promote said catalytic oxidative degradation of said organic compounds;

iv) passing said preheated air stream through said heated packed bed at a flow rate which achieves a desired degree of catalytic oxidation degradation of said organic compounds for said elevated temperature in said packed bed;

v) exhausting said air stream from said packed bed whereby said air stream has increased concentrations of carbon dioxide and water from oxidation of said organic compounds;

vi) said packed catalytic bed being supported in a catalytic reactor having a reactor wall contacting said packed catalytic bed, means for heating, at least a portion of said reactor wall, whereby said packed catalytic bed in contact with said reactor wall is heated to said elevated temperature;

vii) said packed catalytic bed comprising a mixture of heat conductive catalyst pellets having said catalytic material on its surfaces and heat conductive metal turnings, the volume ratio of metal turnings to catalyst pellets being in the range of 1:2 to 2:1, said metal turnings being dispersed throughout said packed bed and in contact with said catalyst pellets for supporting said catalyst pellets in said packed bed and providing said porous packed bed to allow passage of said air stream over said catalytic particles, said metal turnings conducting heat throughout said packed bed to promote uniform temperature distribution within said packed bed.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THIS INVENTION

Figure 1:
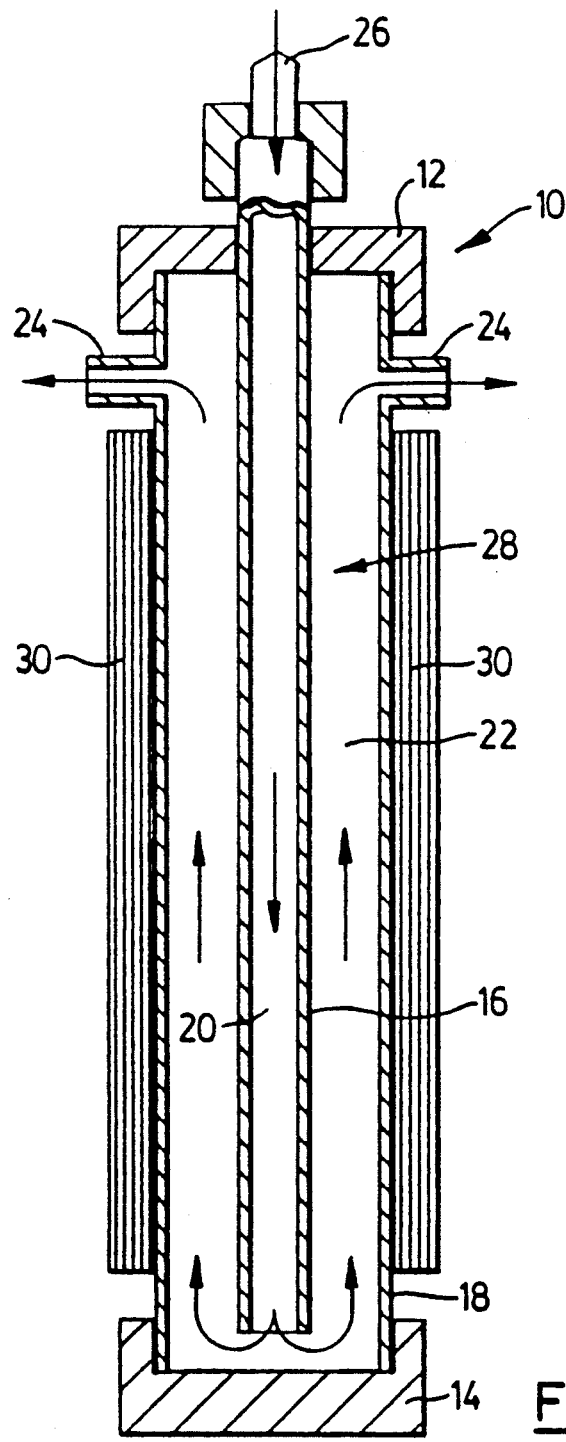
FIG. 1 is a vertical sectional view through an apparatus constructed in accordance with a first embodiment of this invention.

Attention is first directed to FIG. 1, which shows an apparatus 10 consisting of a top mounting member 12, a bottom mounting member 14, and two concentric stainless steel tubes. The tubes consist of an inner tube 16 and an outer tube 18. The arrangement of tubes 16 and 18 is such as to define a catalytic reactor having a first chamber 20 within the tube 16, and a second chamber 22 in the annular space between the two tubes 16 and 18. The inner tube 16 is open at the bottom, which allows the two chambers 20 and 22 to be in communication at the bottom end of the apparatus 10. At the upper portion of the outer tube 18, there are provided outlet means 24 to allow air to be ducted out of the apparatus 10. The inner tube 16, has, at its upper end, an inlet opening 26 through which contaminated air can enter the apparatus. In the figure, the arrows show the flow of air.

In the first embodiment of this invention as illustrated in FIG. 1, a porous packed static catalytic bed 28 is provided in the second chamber 22, i.e. in the annular space between the tubes 16 and 18 of the reactor. Preferably the catalytic bed 28 comprises a mixture of catalytic pellets and metal turnings. By virtue of the packed bed being a mixture of catalytic pellets and metal turnings, a desired degree of bed porosity is achieved to allow the air stream to flow therethrough for purposes of treating the organic contaminants in the air steam. Preferably the catalyst pellets and metal turnings are mixed together at the desired ratio and loaded into the reactor. Glass wool or other suitable retaining mesh is located at each end of the reactor to retain the catalyst in place.

The catalytic pellets may be of any common form of structure, for example, the pellets may have an inert substrate material which is preferably a metal or metal oxide to provide for the desired degree of heat conductivity. The surface of the pellet includes or has the catalytic material which promotes the oxidative degradation of the organic compounds in the air stream. Useful types of oxidative catalytic material are well known and usually selected from noble metals such as, platinum or palladium and perhaps copper as well as composite catalysts which include, in addition to noble metals, one or more metal oxides. Such oxides may function as catalytic reaction promoters. Hence, the metal turnings are of a material which is not readily corroded by components in the air stream and is normally inert to the components of the air steam although it is understood that desired catalyst may also be included on the surfaces of the metal turnings to further enhance the oxidative degradation of the organic compounds. Preferably the catalytic pellets are formed from an aluminum oxide coated with or treated with platinum. The metal turnings, as dispersed throughout the catalytic bed, serve to support the pellets without providing any significant degree of hindrance to the bed porosity so that pressure drop across the bed due the presence of the metal turnings is minimal or at least within a pressure drop range which accommodates the flows of the air stream to be treated. The term metal turnings is used to generically refer to types of metal ribbon and the like which are heat conductive and capable of supporting the catalytic pellets in the catalytic bed. The metal turnings may be derived from turning of various metal work pieces or may be fabricated in other ways to functionally resemble the purpose of the metal turnings. Preferred metals for the metal turnings are selected from the group consisting of stainless steel, bronze, brass, aluminum alloys and the like. Typically, the metal turnings have an overall cross-sectional dimension of one to ten millimetres, and preferably in the range of two to five millimeters. Due to their intermeshed structure, due to the coiled ribbon-like characteristics of the turnings, they provide an excellent support for the catalyst pellets, while allowing flow of gases therethrough without excessive pressure drops. Furthermore, the contacting and distribution of the metal turnings throughout the catalyst pellets of the catalytic bed provides for excellent heat conductivity and thereby insures or substantially insures a uniform temperature distribution across the catalytic bed.

Typically, the aluminum oxide pellets are platinized by being impregnated with from about 1% to about 5% by weight of platinum chloride. This is accomplished by soaking the aluminum oxide pellets in a solution of chloroplatinic acid for several hours, pouring off the solution, then drying the pellets at 50° C. We have found cylindrical aluminum oxide pellets (5.0 mm long by 3.0 mm in diameter) to be very satisfactory, but of course other shapes and sizes can be used. The ratio of stainless steel turnings (coarse, medium or fine) to aluminum pellets, on a volume basis, can be varied from 1:2 to 2:1, without affecting the performance of the purification apparatus. A ratio of approximately 1:1 is preferred for the high flow rates that would be used in commercial applications. We have found that the stainless steel turnings provide more efficient and uniform heating of and hence temperature distribution in the catalyst bed, and afford greater rigidity to the catalyst bed than is provided by the pellets alone held in place by their own weight. The catalyst bed must remain stationary, particularly at high flow rates, in order to maintain the desired catalyst temperature and prevent damage to the pellets which otherwise may clog the outlets and impede air flow.

Various techniques for preheating the contaminated air may be used before the air comes into contact with the catalytic bed 28. In the embodiment illustrated in FIG. 1, preheating is accomplished by conveying the impure influent air stream down the centre of the inner concentric tube 16 which is located in the centre of the catalytic bed 28. The desired temperature is obtained by placing heating elements 30, regulated at the desired temperature, on the external surface of the outer concentric tube 18 of the reactor walls. These heating elements 30 can be uniformly distributed around the periphery of the tube 18, and are of known construction.

For more efficient heating of the influent air stream at high flow rates, the hollow portions of the apparatus 10, particularly the first chamber (that within the inside tube 16) can be loosely packed with stainless steel turnings (coarse, medium or fine-medium turnings being approximately 2 to 5 cm in cross-section).

When the method is aimed at removing all low molecular weight hydrocarbons, the catalytic bed 28 is preferably heated to a temperature between about 300° C. and 350° C. However operating temperatures below 300° C. can be used to remove only the more reactive hydrocarbons such as ethylene. More particularly, is has been found that the temperature below which ethylene will not be removed in the device disclosed herein is about 160° C., as measured on the external surface of the device at the midpoint of the catalyst bed. It will thus be understood that the range of 300° C. to 350° C. given above is merely an optimal range which is high enough to ensure that all hydrocarbons are removed, yet not so high a to make the operation uneconomical (due to heat loss) or to present a safety hazard. Hydrocarbon removal does occur at temperatures above 350° C.

It is also understood that the method is particularly useful in the treatment of other forms of low molecular weight organic compound contaminants, for example, containing heteroatoms such as ethylene oxide and pyridine. It has been found that a desired temperature for the catalytic bed in treating hydrocarbons containing heteroatoms is in the range of 200° C. to 300° C. Ethylene oxide is effectively oxidatively degraded by platinum catalyst at temperatures in the range of 220° C.

Figure 2:
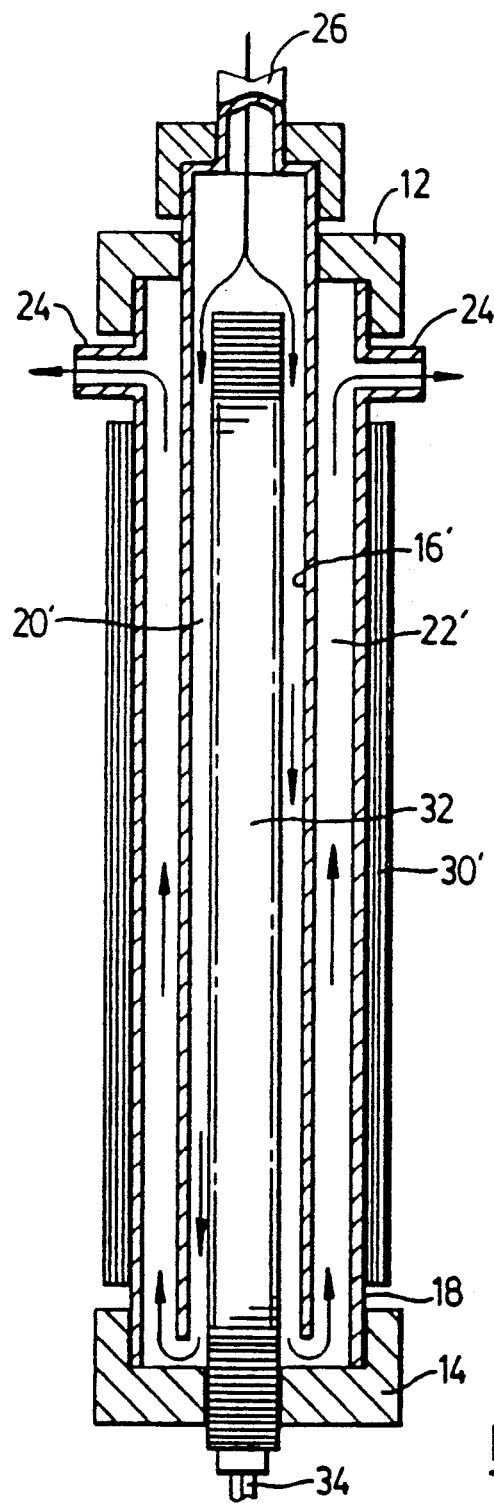
FIG. 2 is a vertical sectional view through an apparatus constructed in accordance with a second embodiment of this invention.

Attention is now directed to FIG. 2, which shows a catalytic reactor embodiment similar to that illustrated in FIG. 1, with the exception that the inside tube 16' is of larger diameter, so that it can accommodate a tubular heater 32, having electrical supply wires 34. The embodiment shown in FIG. 2 can be operated with the tubular heater 32 supplying all of the heat, i.e. with no external heaters, or alternatively may utilize external heating elements 30' located on the outside surface of the outer tube 18. In FIG. 2, the external heating elements 30' are shown to be smaller than the equivalent heating elements 30 shown in FIG. 1. In FIG. 2 then, the preheated impure influent air travelling down the internal tube 16' reverses its direction at the bottom and flows up through the concentric outer tube 18 containing the catalytic bed 22', where low molecular weight hydrocarbon impurities are removed by being oxidized in the presence of the platinum catalyst. The purified air then exits through outlets 24 shown at the top of the outer tube 18.

Figure 3:
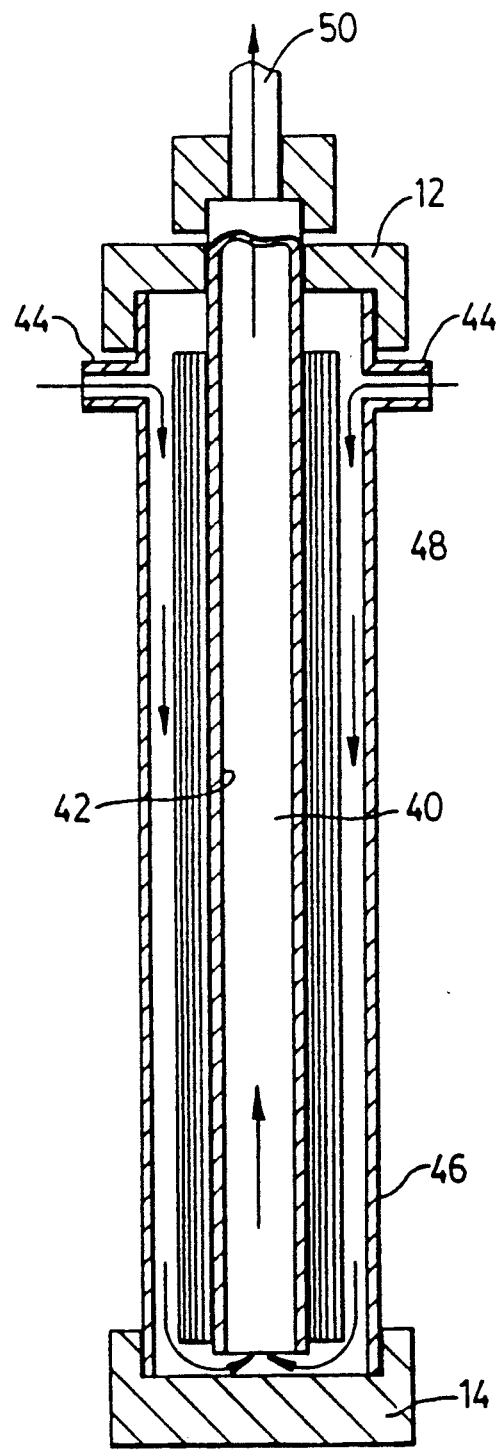
FIG. 3 is a vertical sectional view through an apparatus constructed in accordance with a third embodiment of this invention.

Attention is now directed to FIG. 3, which shows an arrangement for the reactor in which the air flow is reversed from that of the first two embodiments. Specifically, a catalytic bed 40 is provided within the inner concentric tube 42, and impure air is directed inwardly through one or more inlets 44 located at the top of the outer concentric tube 46. Again, the first chamber located inside the inner tube 42 is in communication at the bottom with the second chamber located in the annular space between the two tubes. Thus, air arriving at the bottom of the second chamber passes radially inwardly, thence upwardly through the catalytic bed in the inner tube 42.

Heating of the apparatus is accomplished by heating elements 48 which are located on the external surface of the inner concentric tube 42 in the figure. Alternatively, the heaters may be located on the inner or outer surface of the outer concentric tube 46. Purified air exiting from the bed 40 is removed from the apparatus through the top end 50 of the inner tube 42.

Preferably, all versions of the entire device are enclosed in a high temperature heat insulation and encased in a stainless steel jacket (not illustrated). The temperature can be controlled with a rheostat by regulating the voltage applied to the heaters. A thermocouple placed between the external heater and the outer steel tube 5 cm from the bottom of the reactor vessel can be used to monitor temperature.

EXAMPLE 1

Test Apparatus

The invention described herein was tested in the following manner. A device constructed in accordance with FIG. 1 was allowed to equilibrate for 3 hours following a final temperature and flow rate adjustment. Samples from the influent and effluent gas line were then removed for analysis in a Hewlett Packard Model 5880 gas chromatograph equipped with a stainless steel column (304×0.3 cm) packed with Porapak Q (80–100 mesh; Waters Associated Ltd.) and run isothermally at 50° C. The detection limit for each hydrocarbon was 0.05 ng.

During 10 months of continuous operation, levels of methane, ethane, and ethylene in the air supply ranged from 6.9–8.2, 0.100–0.200, and 0.010–0.020 ppm respectively. Methane is less reactive than both ethane and ethylene and requires a higher temperature for complete oxidation. Consequently the optimum operating temperature at each flow rate was defined as the temperature required to remove all traces of methane. Both ethane and ethylene were completely oxidized under these conditions. Ethylene is more reactive than other hydrocarbons and can be removed at lower temperatures.

At temperatures between 300° and 350° C. (measured with the thermocouple mentioned previously) this purification device removed all traces of methane, ethane, and ethylene in air at space velocities in excess of 10,000 catalyst bed volumes per hour. (Space velocity relates flow to catalyst volume and is a parameter kept constant when scaling a system.) At higher flow rates the air cooled the influent end of the reactor bed and this uneven heating decreased the efficiency of the catalyst to oxidize the less reactive methane. However all traces of ethane and ethylene were removed at space velocities of up to 15,000 catalyst bed volumes per hour when the temperature at the bottom of the outside tube was maintained between 300° and 350° C. Under these conditions, the temperature of the effluent air stream did not exceed 60° C.

The performance of the test apparatus was stable during extended use, when operated in accordance with the conditions defined. No loss of efficiency was detected after 10 months of continuous operation at temperatures between 300° and 350° C., and at a space velocity of 10,000 catalyst bed volumes per hour. Less than 0.25 kW h$^{-1}$ are required to operate the device under these conditions. When encased in the high temperature heat insulation, the apparatus is safe to handle during operation, and can be used in confined areas such as growth cabinets. This purification device has been used to remove hydrocarbon contaminants from air supplies for biochemical and physiological studies on isolated tissues, seeds, and intact plants. In addition, we have used the device to obtain hydrocarbon-free air for gas chromatography. Commercially available cylinders of compressed air contain hydrocarbon impurities at levels that can interfere with the analysis of gas samples, and here again the device of the present invention can find use. It can also be employed to remove hydrocarbons from air supplied to storage chambers containing horticultural products. Since ethylene is known to accelerate the ripening process, ventilating storage chambers with hydrocarbon-free air would prolong the storage life of climacteric fruits. Alternatively, the chamber air could be recirculated through the device to remove hydrocarbons. The device can be used to provide hydrocarbon-free air for other purposes as well.

EXAMPLE 2

Oxidative Degradation of Organic Compounds using Palladium Catalyst

The procedure of Example 1 was followed. Only two runs were provided. One with a platinum catalyst of Example 1 and the other run with a palladium catalyst. Both platinum and palladium were provided on the aluminum oxide pellets at a concentration of 0.5% w/w. There ability of oxidize ethylene in an air stream was compared as follows. In both runs the temperature of the catalyst is as noted with the resultant reduction in ethylene in the air stream to the extent noted in the following Table 1. The incoming air stream had a concentration of ethylene of 100 ppm with the balance being air.

TABLE 1

| Flow (l/min) | Palladium | | Platinum | |
|---|---|---|---|---|
| | Temp (°C.) | [$C_2H_4$] (ppb) | Temp (°C.) | [$C_2H_4$] (ppb) |
| 0.1 | 186 | 0.1 | — | — |
| 1.0 | 185 | 0 | 315 | 0.3 |
| 2.0 | 285 | 1.3 | 302 | 0.2 |
| 4.0 | 340 | 0 | 290 | 0 |
| 7.0 | 325 | 0 | 280 | 0 |
| 10.0 | 300 | 10.0 | 275 | 0 |

From the above it is apparent that palladium is not as effective as platinum in degrading ethylene. Ethylene concentrations in the effluent were measured by a Photovac photoionization detector gas chromatograph. At the higher flow rates for the air stream, it is apparent that palladium is not as effective as platinum in removing the ethylene oxide however, there is a significant reduction in ethylene from the 100 ppm incoming level to only 10 ppb in the exhaust.

EXAMPLE 3

Catalytic Oxidation of Hydrocarbons Containing Heteroatoms

In accordance with the procedure of Example 1, a gas stream containing the heteroatom ethylene oxide and Freon 12 was treated with a catalytic reactor. Ethylene oxide in this carrier and commonly sold under the trademark oxyfume 12 is used for gas sterilization of medical instruments and the like. The sterilizing gas was mixed with air to give the desired ethylene oxide concentration in the incoming air stream of the values noted in the following Table II. The catalytic bed was heated to 222° C. The bed consisted of platinum catalyst pellets supported by stainless steel metal turnings. The flow rate of the mixture through the catalytic bed was set at 100 ml/min. The effectiveness of the reactor in oxidatively degrading ethylene oxide is set out in the following Table II.

TABLE II

| | Ethylene Oxide (ppm) | | |
|---|---|---|---|
| | Entering purifier | Leaving purifier | % removed |
| Day 1 | 195.1 | 0.26 | 99.87 |
| | 186.4 | 0.18 | 99.90 |
| | 141.7 | 0.11 | 99.92 |
| | 91.2 | 0.14 | 99.85 |
| Day 2 | 197.1 | 0.13 | 99.93 |
| | 170.0 | 0.12 | 99.93 |
| | 250.2 | 0.08 | 99.97 |
| | 240.3 | 0.08 | 99.97 |
| | 176.6 | 0.06 | 99.97 |
| | 675 | 0.01 | 99.998 |
| | 667 | 0.09 | 99.99 |

At the above noted temperature of operation, very high percent removal of ethylene oxide concentrations were achieved.

GENERAL DISCUSSION

In order to remove hydrocarbon impurities at flow rates higher than 15,000 catalyst bed volumes per hour, a greater platinum content (5% by weight) and/or pressurization of the reactor vessel is required. The reactor vessel can be pressurized by reducing the aperture of the outlet or outlets. However, higher flow rates can reduce the efficiency of heat exchange. Nonetheless, a cooling trap/coil wrapped around the effluent line or a heat exchanger in the effluent line could be used to cool down the purified gas stream to desired temperatures.

Due to the incorporation of a good thermal conductor (coarse, medium or fine metal turnings) into the reactor bed, and the preheating of the influent air stream, it is possible to obtain a more efficient and uniform heating of the catalyst, and a more efficient heat transfer to the influent impure air stream. Moreover, this makes the catalyst bed more rigid without impeding air flow. As a result, the apparatus described herein can be operated at lower temperatures and at substantially higher flow rates (space velocity of 10,000 catalyst bed volumes per hour at 300° to 350° C.) than normal for devices of this type. These low temperatures will not produce biologically active levels of nitrous oxides or ozone, which are of great concern in biological studies. The provision of aluminum oxide pellets also offers less resistance to air flow and better heat conductivity than would be the case with some other catalyst support materials (like asbestos). A final advantage of the preferred embodiment of this invention is that the device is constructed out of incombustible and non-toxic materials.

While several embodiments of this invention have been illustrated in the accompanying drawings and described hereinabove, it will be evident to those skilled in the art that changes and modifications may be made therein, without departing from the essence of this invention, as set forth in the appended claims.

We claim:

1. A method for catalytically oxidizing low molecular weight organic compounds in an air stream containing such organic compounds to remove such organic compounds from such air stream by oxidative degradation of such organic compounds into carbon dioxide and water, said organic compounds being selected from the group comprising methane, ethane, ethylene, ethylene oxide and pyridine, said method comprising:

i) preheating said air stream to an elevated temperature in the range of 160° C. to 350° C. which promotes catalytic oxidation of said organic compounds into carbon dioxide and water;
   ii) introducing said preheated air stream to a porous static packed bed of catalytic material;
   iii) heating said packed catalytic bed and maintaining said packed catalytic bed at an elevated temperature to promote said catalytic oxidative degradation of said organic compounds;
   iv) passing said preheated air stream through said heated packed bed at a flow rate which achieves a desired degree of catalytic oxidation degradation of said organic compounds for said elevated temperature in said packed bed;
   v) exhausting said air stream from said packed bed whereby said air stream has increased concentrations carbon dioxide and water from oxidation of said organic compounds;
   vi) said packed catalytic bed being supported in a catalytic reactor having a reactor wall contacting said packed catalytic bed, means for heating, at least a portion of said reactor wall, whereby said packed catalytic bed in contact with said reactor wall is heated to said elevated temperature;
   vii) said packed catalytic bed comprising a mixture of heat conductive catalyst pellets having said catalytic material on its surfaces and heat conductive metal turnings, the volume ratio of metal turnings to catalyst pellets being in the range of 1:2 to 2:1, said metal turnings being dispersed throughout said packed bed and in contact with said catalyst pellets for supporting said catalyst pellets in said packed bed and providing said porous packed bed to allow passage of said air stream over said catalytic particles,
   said metal turnings conducting heat throughout said packed bed to promote uniform temperature distribution within said packed bed.

2. A method of claim 1, wherein said metal turnings are selected from the group of metal turnings made from stainless steel, brass, aluminum alloys and bronze.

3. A method of claim 1, wherein said catalyst pellets have catalytic material selected from the group consisting of platinum, palladium, other noble metals and metal oxides effective for catalytic oxidation of organic molecules.

4. The method claimed of claim 1 wherein the metal turnings are stainless steel and the pellets are aluminum oxide pellets impregnated and coated with platinum chloride, the latter being present at from 1% to 5% by weight.

5. The method of claim 1 wherein the bed is heated to a temperature between about 300° C. and 350° C.

6. The method of claim 1, wherein the method of removing ethylene, the bed is heated to a temperature between 160° C. and 300° C.

7. The method of claim 1, wherein the packed bed is contained in the annular space defined between two substantially vertically oriented and substantially concentric tubes made of heat-conductive material, having heating means applied against the exterior of the outermost tube, in which step i) is performed by passing the air downwardly through the innermost of the two tubes to the bottom thereof, and in which step iv) is performed by passing the air upwardly through the bed between the tubes.

8. The method of claim 1, wherein the packed bed is contained within the innermost of two substantially vertically oriented and substantially concentric tubes made of heat-conductive material, having heating means applied against the exterior of the innermost tube within the outermost tube, in which step i) is performed by passing the air downwardly through the annular space defined between the two tubes, and in which step iv) is performed by passing the air upwardly through the bed within the innermost of the two tubes.

9. The method of claim 7, wherein the performance of step i) includes heating the air with a heater located within the innermost of the two tubes.

* * * * *